US005196139A

United States Patent [19]

Moschner

[11] Patent Number: 5,196,139

[45] Date of Patent: Mar. 23, 1993

[54] BLEACH ARTICLE CONTAINING POLYACRYLATE OR COPOLYMER OF ACRYLIC AND MALEIC

[75] Inventor: Karl Moschner, Troy, N.Y.

[73] Assignee: Lever Brothers Company, Division of Conopco, Inc., New York, N.Y.

[21] Appl. No.: 685,975

[22] Filed: Apr. 15, 1991

Related U.S. Application Data

[63] Continuation of Ser. No. 368,437, Jun. 19, 1989, abandoned.

[51] Int. Cl.[5] .......... C09K 3/00; C11D 17/00

[52] U.S. Cl. .......... 252/186.25; 252/186.34; 252/187.1; 252/90; 252/91; 252/94; 8/101

[58] Field of Search .......... 252/186.25, 186.34, 252/186.35, 186.36, 186.37, 187.1, 187.2, 187.21, 187.23, 187.24, 187.25, 187.26, 187.27, 187.28, 187.24, 187.3, 90, 91, 94; 8/101

[56] References Cited

U.S. PATENT DOCUMENTS

| | | | |
|---|---|---|---|
| 3,580,851 | 5/1971 | Heid et al. | 252/99 |
| 3,634,260 | 1/1972 | Pickin | 252/95 |
| 3,816,321 | 6/1974 | Kleinschmidt | 252/134 |
| 3,945,936 | 3/1976 | Lucas | 252/95 |
| 3,985,668 | 10/1976 | Hartman | 252/99 |
| 4,005,027 | 1/1977 | Hartman | 252/99 |
| 4,011,172 | 3/1977 | Marsan et al. | 252/187 |
| 4,017,411 | 4/1977 | Diehl et al. | 252/186 |
| 4,051,056 | 9/1977 | Hartman | 252/99 |
| 4,105,573 | 8/1978 | Jacobsen | 252/99 |
| 4,116,851 | 9/1978 | Rupe et al. | 252/103 |
| 4,130,392 | 12/1978 | Diehl et al. | 8/101 |
| 4,151,104 | 4/1979 | Alvarez et al. | 252/99 |
| 4,166,794 | 9/1979 | Grey | 252/8.8 |
| 4,238,531 | 12/1980 | Rudy et al. | 252/8.6 |
| 4,273,661 | 6/1981 | Grey | 252/8.8 |
| 4,286,016 | 8/1981 | Dimond et al. | 428/311 |
| 4,337,163 | 6/1982 | Schilp | 252/103 |
| 4,391,723 | 7/1983 | Bacon et al. | 252/90 |
| 4,529,480 | 7/1985 | Trokhan | 162/109 |
| 4,532,063 | 7/1985 | Guledenzopf | 252/90 |
| 4,557,852 | 12/1985 | Schulz et al. | 252/95 |
| 4,638,907 | 1/1987 | Bedenk et al. | 206/0.5 |
| 4,652,390 | 3/1987 | Stampach et al. | 252/92 |
| 4,725,378 | 2/1988 | Krawczak | 252/95 |
| 4,740,326 | 4/1988 | Hortel et al. | 252/90 |
| 4,797,221 | 1/1989 | Gueldenzopf | 252/186.34 |

OTHER PUBLICATIONS

Attachment 1—Industrial Uses of ACL Chlorinating Compositions.

*Primary Examiner*—A. Lionel Clingman
*Assistant Examiner*—Bradley A. Swope
*Attorney, Agent, or Firm*—A. Kate Huffman

[57] ABSTRACT

A thickened chlorine bleach slurry comprising a dry chlorine bleach compound, a dispersant and water having improved slurry stability and bleaching activity. The composition may be applied to and dried on a water-insoluble substrate for a laundry bleaching product which, when placed in the wash liquor, releases the chlorine bleach.

8 Claims, 2 Drawing Sheets

BLEACH ARTICLE CONTAINING POLYACRYLATE OR COPOLYMER OF ACRYLIC AND MALEIC

This is a continuation application of Ser. No. 07/368,437, filed June 19, 1989 now abandon.

This invention pertains to the field of bleaching articles and compositions for use in washing laundry articles.

BACKGROUND OF THE INVENTION

Bleaching products for use in laundering of fabrics conventionally have been sold in the form of powders and liquids. Consumers have thus been required to measure appropriate dosages from containers holding these products each time they wish to bleach a load of laundry. This measuring process has several drawbacks which are perceived by consumers as rendering liquid or powder bleach inconvenient: the liquid or powder products are easy to spill and not simple to measure accurately. Moreover, consumers usually use about the same amount of bleach for each wash; thus, remeasuring the amount they desire repeats a step performed many times before. Bleach compositions have the additional problem that bleach activity is lost over time; this is especially so for chlorine bleaches in an aqueous liquid.

Liquid bleach compositions in several forms are known, e.g. liquids, powders or pastes (U.S. Pat. No. 4,105,573). It has sometimes been deemed desirable to thicken liquid bleaches. Bleach composition thickeners have included clay, alone or combined with certain polymers (U.S. Pat. Nos. 4,116,849 and 4,116,851) as well as with mixtures of detergents (U.S. Pat. No. 4,337,163); cellulose derivatives and colloidal silica (U.S. Pat. No. 4,011,172).

Delivery of bleach to a washer is made somewhat simpler by use of a pouch. Dry particulate bleach has thus been added in water-soluble film packets (U.S. Pat. No. 3,644,260) as well as in porous pouches (U.S. Pat. No. 4,286,016). Indeed, U.S. Pat. Nos. 4,638,907 and 4,659,390 disclose adding several cleaning actives at once, between two layers of polymeric material laminated together, in a product which segregates each active from the others.

Less common than pouch-delivery of bleach has been delivery of dry chlorine bleach particles by water-soluble sheets (U.S. Pat. No. 4,532,063; 4,557,852 and 4,654,395).

There has been little use of non-water soluble sheet delivery systems for bleach. Applicant believes such systems may afford significant benefits over the art.

Yet certain disadvantages arise with single sheet-type laundry articles. Thus, some substrates are weakened and torn apart by washing, leaving unpleasant pieces to be removed from laundry by the consumer. Many substrate materials for carrying the bleach composition are not bleach-stable and thus disintegrate during storage or become unattractive to use. The requirements of mechanical and bleach stability restricts the substrate materials which may be used.

Even if the substrate is bleach stable, the composite bleaching article should retain its pleasant feel and texture during storage. Some articles lose their pleasant feel and become brittle due, it is believed, to adsorption of ambient moisture. The need to impart a lasting hand and resilience to the bleaching articles also affects the substrates, as well as the chemical compositions, which may be used.

There are further difficulties in processing single sheet-type laundry articles. For example, the bleach composition applied to the sheet should preferably be a viscous material which does not tend to run off the substrate. Additionally, aqueous chlorine bleach compositions have insoluble bleach particles which may not be easily suspended. Syneresis in the bleach composition to be applied to the substrate thus may cause uneven bleach doses from sheet to sheet.

Accordingly, it is an object of the present invention to provide a bleaching article in the form of a bleach-carrying substrate which is flexible when handled, and has a pleasant supple feel rather than a wet, greasy or tacky feel.

It is also an object of the present invention to provide an effective bleaching article for use in an automatic washing machine for laundry fabrics.

Another object of the invention is to provide a bleaching article that is simple to manufacture and convenient to store.

It is a further object of the present invention to provide a bleaching article which does not suffer from loss of bleaching activity and does not suffer physical damage in storage or in use. Physical damage includes shredding of the substrate in the wash as well as substantial flaking off of bleaching composition from the substrate surface.

It is yet another object of the invention to provide an aqueous bleach composition which does not suffer from phase separation and may be applied to a flexible substrate.

SUMMARY OF THE INVENTION

In one embodiment of this invention, an aqueous liquid bleach composition comprises 20–90% of chlorine bleach compound, 2–50% of a dispersant and water, the composition forming an aqueous slurry having a pH of 5 to 8. The viscosity is from 100 to 100,000 centipoises at 25° C., preferably from 500 to 6,000 centipoise. The slurry may be further thickened by an alkali, metal salt.

The aqueous slurry may further comprise 2–35% of a cobinder material which contributes to binding undissolved particles of bleach to a flexible substrate. The slurry may further optionally include 0.1–10% surfactants and 0.1–10% fluorescent whitening agent.

A bleaching article is provided comprising:

( i) a flexible substrate; and (ii) a dried bleaching composition carried on said substrate, said composition comprising:

a. 20–90 wt. % of a chlorine bleach, and b. 2–50 wt. % of a dispersant material, the dried composition being derived from an aqueous bleach slurry having pH of 5 to 8. The dried bleaching composition is substantially free of free water but may have up to 20% water of hydration.

It is important that the components of the slurry and bleaching article are bleach stable. Suitable dispersants, cobinders, substrate materials, etc. are identified as bleach stable by having ignition temperature (defined below) of at least 150° C., chlorine scavenging half life (defined below) of over 24 hours and chlorine capacity ratio (defined below) of less than 10% of their weight.

Once the liquid bleach composition has been dried to the substrate, the level of water of hydration adsorbed by the bleaching article depends on ambient humidity conditions and the composition of the dried bleaching composition. Certain suitable components of this composition (e.g. the dispersant or cobinder) are hygroscopic and may absorb waters of hydration from ambient humidity. A preferred embodiment has dispersant and cobinder components which have relatively little hygroscopicity.

A method of bleaching laundry and/or fabrics is further an aspect of the present invention: in this method, the bleaching article described above is placed in the washing machine with laundry and run through the full wash cycle. The bleach slurry material dried on and into the substrate dissolves or disassociates from the substrate to release active chlorine into the wash water.

DETAILED DESCRIPTION OF THE INVENTION

Figure 1:
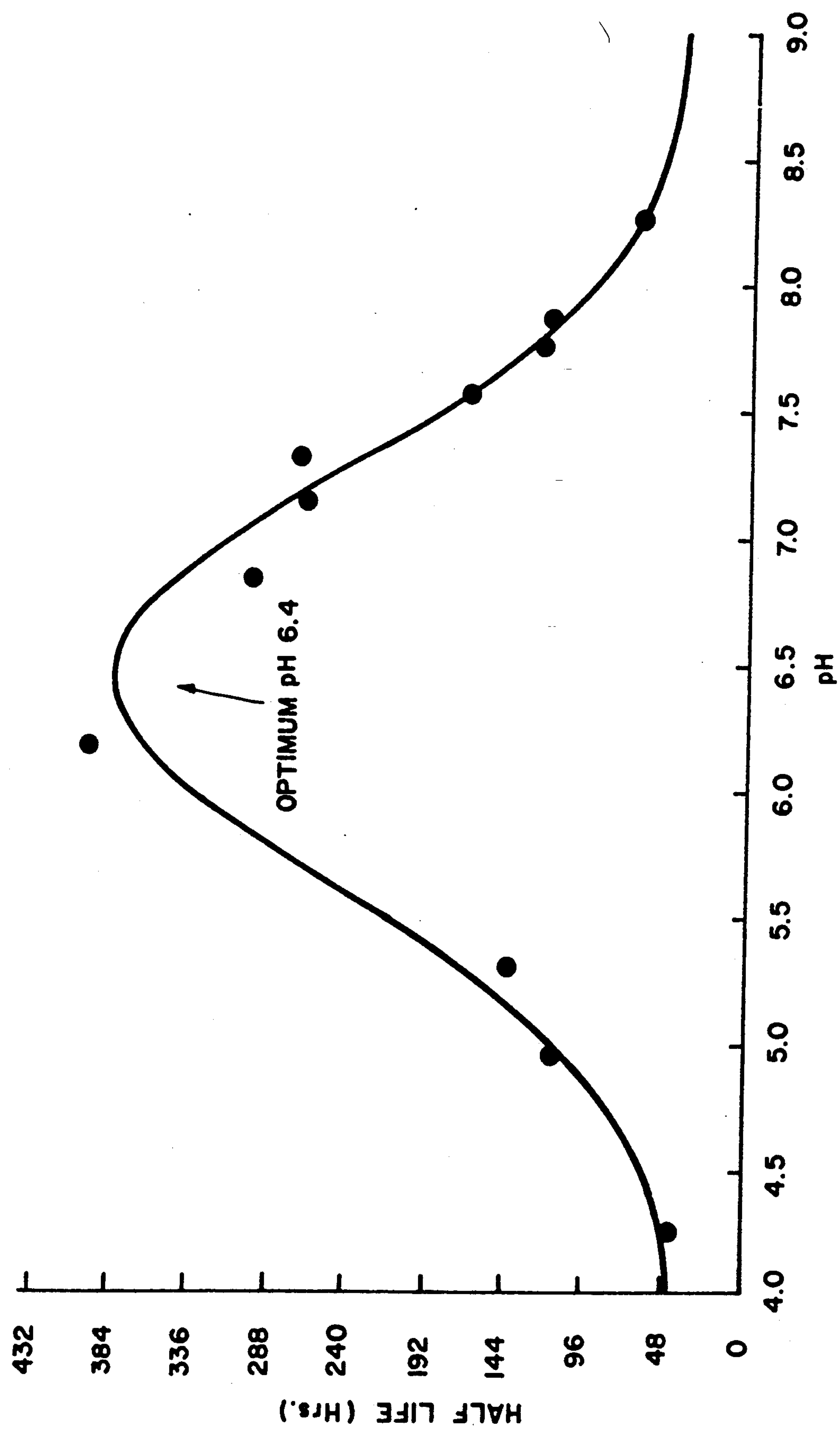
FIG. 1 diagramatically illustrates the rise in the half life of chlorine in samples in the presence of a polyanionic dispersant.

An aqueous bleach slurry composition may include 20–90% chlorine bleach, or 30–70%, or 35–65%. (Unless otherwise noted, all percentage amounts in this specification indicate % by weight.) The amount of bleach in the slurry may be chosen to deliver a certain amount of bleach to the wash.

Chlorine Bleach

The chlorine bleach compounds suitable for the thickened aqueous slurry should have low water solubility and good bleach performance on a weight basis. Suitable types of bleach compounds include chlorinated isocyanurates and halo hydantoins. Suitable chlorinated isocyanurates include sodium dichloroisocyanurate and its dihydrate ("NaDCC"), potassium dichloroisocyanurate, trichloroisocyanurate and the like. One commercially available sodium dichloroisocyanurate dihydrate which may be used in the slurry is CDB Clearon, ex Olin Corp., sold as a powder with particle size of from about 1 to about 200 microns. Among the halo hydantoins suitable for the slurry are dialkyl hydantoins, alkylaryl hydantoins or diaryl hydantoins. More particularly, these include 1,3-dichloro-5,5-dimethyl hydantoin ("DCDMH"), N-monochloro-5,5-dimethylhydantoin, methylene-bis 1,3-dichloro-5-methyl-5-n-isobutylhydantoin, 1,3-dichloro-5-methyl-5-n-amylhydantoin, bromochloro-5,5-dimethyl hydantoin ("BCDMH") and the like.

Other useful bleach compounds are trichloromelamine, N-chloromelamine, monochloramine, dichloramine, paratoluene sulfondichloroamide, N,N-dichlorooxodicarbonamide, N-chloroacetyl urea, and N,N-dichlorobiuret, chlorinated dicyandiamide, dichloroglycoluril, N,N-dichlorobenzoylene urea, and N,N-dichloro-P-toluene sulfonamide and mixtures, etc.

The aqueous slurry has pH of about 5–8. As demonstrated in Example 1 below, at preferred pH 5.5 to 7.5, bleach half life is nearly doubled over the half life at pH 5.0. And at most preferred pH 6.0 to 7.0, bleach half life is triple that at pH 5.0.

The thickened bleach composition may comprise several components in addition to bleach and water. But because the bleach slurry is more harsh than commercial caustic chlorine solutions (owing to the higher available chlorine concentration), and the neutral pH increases reactivity of free chlorine, hypochlorous acid and its salts, many compounds are not stable in such an environment. If components chosen are not bleach-stable, they may impair production of the bleach slurry, or render it unattractive or non-functional.

Three tests were developed to identify components which are compatible with the strongly oxidizing slurry: the ignition test, the chlorine scavenging test and the the chlorine capacity test, described in Examples 4 and 5 below. Satisfactory results for each of the tests are indicated in these Examples. However, it should be noted that a satisfactory result in one test does not indicate a component has bleach stability; rather, one must consider the results of all three tests.

Aside from such cosmetic and operational considerations, the bleach slurry and article require care in manufacture to avoid the risk of exothermic reactions. Ammonium compounds must not be used under any circumstances in the bleach slurry since they can give rise to chloramines. Of particular concern is the accidental use of the common ammonium salts of polymeric acids. Trichloramine is one of the most significant hazards faced when working with chlorine bleach. The chlorinated isocyanurates will generate chloramines in the presence of ammonia or ammonium salts or on their own in high concentrations at $10<pH<5$. Other nitrogen compounds should also be avoided. Experience has shown that violent decomposition may occur without warning.

Dispersant Material

The bleach slurry further includes 2–50% by weight of a dispersant material. The dispersant acts to reduce solubility of the bleach, thereby salting out chlorine bleach. The result of this salting out is to increase the level of insoluble chlorine bleach in the slurry, thus increasing the viscosity of the slurry. Several dispersant materials also contribute to binding the dried slurry to the substrate in bleaching articles described below.

Suitable dispersants are those which have satisfactory ignition temperature, chlorine scavenging half life and chlorine capacity as defined in Examples 4 and 5. These dispersants include: oligomeric or polymeric polyanionic materials. These materials may be straight chain or branched. Suitable polymeric materials include homo- and copolymers of acrylates, methacrylates, maleates, vinyl acetate, styrene and sulfonated styrene. Copolymeric materials may have regular or block structures. Further suitable polymeric materials include sulfonated polystyrene-co-maleate and polyvinyl sulfonate. Preferred dispersants include polyacrylates and copolymers of acrylic and maleic acid.

The molecular weight of the polymeric polyanionic dispersants should be from about 1,000 to about 100,000, with weights of about 5,000 to about 50,000 being preferred.

Suitable oligomeric materials include homo- or co-oligomers of the monomeric materials identified above, and should have molecular weights of about 200 and 1,500. A suitable commercially available product is Belclene (ex Ciba Geigy), an oligomer of maleic acid available in molecular weights of 400–600 and 600–800.

Several inorganic salts may be used as auxiliary dispersants in the slurry. The greater solubility of these salts further reduces the solubility of the bleach. These salts include alkali or alkaline metal salts of mono-phosphates, sulfates, phosphonates and sulfonates. Potassium salts have the surprising ability to impart significantly greater viscosity, especially in combination with polymeric dispersants. Common dispersant materials such as polyphosphates are unsuitable because they have low solubility with respect to chlorine bleach. For example, when sodium dichloroisocyanurate is added to a solution of sodium diphosphate, the latter crystallizes out of solution. Sodium chloride is also unsuitable since chloride accelerates loss of chlorine bleach activity.

The preferred dispersant materials are the polymeric polyanionic compounds. These have been found to impart lowered solubility to the bleach in the slurry. The resulting higher viscosity is due, it is believed, to the greater amount of insoluble bleach and, in part, the polymeric dispersant molecules (see Example 3 below). But the polymeric dispersants also impart phase stability to the slurry: these dispersants help disperse the bleach particles in the slurry and prevent unattractive settling out, as demonstrated in Example 2.

Depending on the amount of dispersant added, the slurry viscosity may range from 100 to 10,000 centipoises, at 25° C. as measured with a Haake Rotovisco viscometer model RV-3 and either an MK-50 or MK-500 measuring head and an MV1 and SV1 cup and spindle. It is preferred that slurries have viscosity less than 6,000 centipoises for easy pouring; viscosities of less than 3,000 are more preferred, with viscosity from 500–1,500 imparting desirable pouring speed with attractive rich consistency to the slurry. The viscosity of the bleach slurry is examined in Examples 6.

Examples 1, 2 and 3 which follow illustrate the effect of neutral pH and dispersant level on bleach activity and physical stability of the bleach slurry.

EXAMPLE 1

The bleaching strength of an aqueous solution containing a chlorine bleach is expressed in terms of available chlorine. This strength, or oxidizing power, of the solution is measured by the ability of the solution to liberate iodine from an acidified iodide solution in a standard iodometric titration. This oxidizing power normally diminishes the longer dry chlorine bleaches are exposed to water, and can even be lost when most of the chlorine bleach is present as suspended particles.

Buffered aqueous solutions of 5% sodium polyacrylate (molecular weight 10,000) at pH values of 4.2, 4.9, 5.3, 6.0, 6.8, 7.0, 7.2, 7.4, 7.5, 7.7, 7.8 and 8.3 are made. Sodium dichloroisocyanurate dihydrate is added to give a concentration of 2000 ppm av. $Cl_2$ in each solution. By performing iodometric titration of acidified aliquots periodically, the half life of chlorine in each solution is determined. At pH 4.3 and 8.2, half life is only about 50 hours. As FIG. 1 shows, in the presence of a polyanionic dispersant, the half life rises significantly between pH 5–8, is quadrupled at pH of 5.5–7.5 and quintupled at pH of 6.0–7.0. These are significant increases in half life: at preferred pH of 5.5 to 7.5, half life is nearly double that of pH 5.0, while at most preferred pH 6.0 to 7.0, half life is tripled.

EXAMPLE 2

The role of the dispersant as a stabilizer of the slurry is seen in the following test, where six 200 g slurries are mixed with 107 grams of bleach and different amounts of water (42–67 grams) and polyacrylate dispersant (51–26 grams of LMW-100N ex Rohm & Haas Corp., neat polymer molecular weight 10,000). The slurries are mixed well with a glass stirring rod and then transferred to 250 ml graduated cylinders with ground glass stoppers. Twenty four hours after mixing slurries 1 through 6, the settling of bleach particles in each is read by measuring the total slurry volume (Vt) and the volume of clear supernatant at the top of the slurry (Vs). The percentage of the total slurry which forms clear supernatant indicates the volume of slurry from which bleach has settled.

| Slurry | Components | % by weight of slurry | Vt (in mls) | Vs (in mls) | Vs/Vt (%) |
|---|---|---|---|---|---|
| 1 | 107 g bleach | 53.5 | 115 | 6 | 4.7 |
| | 42 g water | 36.3 | | | |
| | 51 g polyacrylate | 10.2 | | | |
| 2 | 107 | 53.5 | 127 | 8 | 6.1 |
| | 47 | 37.3 | | | |
| | 46 | 9.2 | | | |
| 3 | 107 | 53.3 | 132 | 11 | 8.6 |
| | 52 | 36.3 | | | |
| | 41 | 8.2 | | | |
| 4 | 107 | 53.5 | 128 | 13 | 9.8 |
| | 57 | 39.3 | | | |
| | 36 | 7.2 | | | |
| 5 | 107 | 53.5 | 132 | 15 | 11.4 |
| | 62 | 40.3 | | | |
| | 31 | 6.2 | | | |
| 6 | 107 | 53.5 | 132 | 17 | 12.9 |
| | 67 | 41.3 | | | |
| | 26 | 5.2 | | | |

As the amount of dispersant falls from 10.2 to 5.2 weight %, there is a corresponding increase in the amount of phase separation from 4.5 to 12.9 supernatant volume %. This shows that polyacrylate dispersant increases phase stability of the chlorine bleach slurries.

Bleach sheet articles are prepared in a fume hood by painting the day old slurry onto swatches of International Paper 9335064 polyester nonwoven. The articles are evaluated after drying over night at ambient 27% relative humidity.

| Dispersant in original slurry (wt %) | Sheet Evaluation |
|---|---|
| 10.2 | excellent, flexible, very low dusting |
| 9.2 | good, flexible, low dusting |
| 8.2 | fair, dusty, limited web penetration |
| 7.2 | fair, similar to 8.2% formulation |
| 6.2 | unacceptable, too dusty |
| 5.2 | unacceptable, too dusty |

Thus, the greater the amount of dispersant, the more retentive is the dried slurry to the substrate.

EXAMPLE 3

Three slurry compositions are made with the following ingredients:

| A | B | C |
|---|---|---|
| 30 g NaDCC bleach | 30 g NaDCC bleach | 30 g NaDCC bleach |
| 10 g polyacrylate | 10 g polyacrylate | 10 g polyacrylate |
| 50 ml water | 50 ml of 1M Na phosphate | 50 ml of 1M K phosphate |
| pH 7 | pH 7 | pH 7 |

The compositions A–C are made by adding water to a vessel, followed by phosphate salt if any, then polyacrylate and finally bleach.

Each of the three bleach slurries is tested for the amount of chlorine present in the aqueous phase only. This is done by standard iodometric titration. The following levels of available chlorine are found:

| A | B | C |
|---|---|---|
| 5.5% av $Cl_2$ (10% bleach) | 4.1% av $Cl_2$ (7% bleach) | 1.5% av $Cl_2$ (3% bleach) |

Usually, NaDCC is soluble in water up to about 35%. Thus, the dispersant polyacrylate alone reduces the amount of available chlorine in the aqueous phase of the slurry down to only about 10%. Phosphate salts, especially potassium phosphate, reduce the level even more, and can even be seen to increase the viscosity significantly.

Cobinder

While the polyacrylate acts as a binder for the bleach particles when dried, the slurry may further include an adhering substance, and further reducing the level of dusting by dried slurry from substrates. The adhering substance is believed to play a role in binding the undissolved bleach particles to the substrate. Suitable adhering substances, or "cobinders" have satisfactory ignition temperature, chlorine scavenging half life and chlorine capacity and include latexes.

(As will be discussed below, some substrates are composed of fibers held together by a resinous substance. The resinous substance, usually called a "binder", is present on the substrate fibers when received from the manufacturer. In this application, the term "co-binder" is used as a synonym for adhering substance, and is not to be understood, except for the circumstances explained below, as a binder material on a substrate.)

It is desirable to incorporate one or more cobinder materials into the bleach slurry for several reasons. The cobinder improves retention of the dried slurry to the substrate during storage. Also, cobinders such as film forming latexes have significantly lower hygroscopicity than many of the suitable. dispersant materials (e.g., polyacrylate). Thus, a slurry, and bleach sheet articles coated therewith, having a blend of dispersant and cobinder, absorb less ambient humidity. In addition, latexes with low glass transition temperature (Tg) are more flexible and less brittle than polyacrylates and thus contribute to a better "hand" for the bleach sheets.

The bleach slurry may include 2-35%, preferably 5-30% and most preferably 8-25% co-binder.

Surfactant

The bleach slurry may be formulated without surfactant: added directly to the wash the slurry bleaches well. Moreover, the slurry readily penetrates substrate materials despite the hydrophobic character of polyester and polyolefin substrates. Nevertheless, certain surfactants improve wetting of the slurry on the substrate and thereby assist application of the slurry to a substrate and foster wetting of the sheet in the wash cycle.

Surfactants are selected based on their performance and the bleach compatibility criteria used for dispersants (see Examples 4 and 5). Suitable surfactants among the anionics include $C_8$–$C_{22}$ soaps; aryl sulfonates, available as Dowfax surfactants ex Dow Chemicals; long chain ($C_8$–$C_{22}$) alkyl sulfates and sulfonates, and $C_6$–$C_{18}$ alkyl benzene sulfonates. These alkyl groups may be straight or branched. Two commercially available branched alkylated anionics suitable for the bleaching article are sodium heptadecyl sulfate (Niaproof 7 ex Niacet Corp., Niagara Falls, N.Y.) and sodium 2-ethylhexyl sulfate (Niaproof 08 ex Niacet Corp.). Suitable nonionic surfactants include amine oxides.

While soaps, Dowfax and alkylbenzene sulfonates may improve substrate and bleach article wetting, they may also lead to deleterious foaming under certain processing conditions. Thus, levels of these materials should be minimized to 0.1–10%, or preferably 0.5–5% surfactant, or most preferably 1–3%. Surfactant amounts may be greater than 10%, i.e. up to 15 or 20%, but such levels will not significantly improve results.

Fluorescer

Fluorescent whitening agents may optionally be included in the slurry. These are generally known to provide brightening benefits in the wash. However, most fluorescent whitening agents lose their activity in the presence of chlorine bleach, making it difficult to deliver fluorescers from a bleach system. A few special fluorescer materials, from the family of sulfonated stilbenes are more resistant to oxidative degradation. These include Tinopal CBS-X and Tinopal RBS-200 (ex Ciba Geigy and described in U.S. Pat. No. 4,460,485, hereby incorporated by reference) and Phorwhite BHC-766 (ex Bayer-Mobay). Any sulfonated stilbene fluorescer may be incorporated in the bleaching composition, however, the three identified fluorescers are preferred.

Phorwhite BHC-766 is the most effective of these whiteners, because it loses less activity than Tinopal CBS-X, and reacts less with the chlorine of the thickened bleach slurry than RBS-200. Phorwhite BHC-766 has additional benefits in being readily dispersible in the bleach slurry and retaining stability under processing and storage conditions. -The stability of Phorwhite BHC-766 is attributed to low reactivity and low solubility in the aqueous phase of the slurry. (See Example 7 below.)

The thickened bleach composition may contain from 0.01–10% fluorescing agent, or 0.5–5% or 1–3%.

A preferred embodiment of the bleach slurry comprises 40–60% chlorine bleach, 4–18% dispersants and binders, 0–10% fluorescer and 25–60% water.

Process of Making Slurry

The components of the aqueous bleach slurry may be mixed in any order using conventional equipment for making aqueous dispersions.

As indicated above, all the components of the slurry may be added to the water base as liquid solution or suspension or as a solid. When one or more of the oomponents are in liquid form (as when LMW-100N ex Rohm & Haas Corp., a 40% solution of polyacrylate is used), it is useful to add such liquid components to the water base before adding any solid ones. This is because some of the solid components may significantly increase viscosity of the aqueous composition. Thus, for example, if powder chlorine bleach is added to water, the slurry formed gradually becomes more and more viscous. Mixing in liquid components prior to making the aqueous composition becomes viscous assures thorough dispersion of all components throughout the slurry. Accordingly, a preferred method of stabilizing an aqueous bleach composition against phase separation comprises: adding 2–50% by weight of a dispersant material to an aqueous base, neutralizing this mixture to a pH of 5 to 8, and adding 20–90% by weight of a dry chlorine bleach to the neutralized mixture to form the bleach slurry.

In mixing the liquid components into the water base, conventional mixing machinery and techniques may be used; the mixing should run as long as needed to impart substantial homogeneity to the aqueous composition.

The addition of solid components may also be performed using conventional mixing machinery techniques. However, it is preferred to employ a high shear mixer, such as a Cowles mixer, if solid bleach is added to the aqueous base. The high shear imparted by this mixer is believed to mix the components better than non-high shear mixers.

When solid components are added to the water or aqueous base, it is preferred to add them gradually with constant mixing to avoid clumping. It is even more preferred to add solid components in constant weight amounts to the base followed by a set amount of time to mix the newly added solid adequately into the base.

Other components beside bleach may be added as solid, for example, the fluorescing agent. When adding solid components used in low amounts, it may be desirable to add them to the aqueous base prior to the bleach. Such an order of addition may mix the fluorescing agent more evenly through the entire slurry.

Alternatively, all the solid components may be combined and mixed when dry then added to the aqueous base.

The Substrate

Substrates employed herein are water-insoluble and are solid or substantially solid materials. They can be dense or open in structure, preferably the latter. Examples of suitable materials which can be used as a substrate include foam, sponge, paper, woven or nonwoven cloth. The absorbent capacity, thickness and fiber density of the substrate are not limitations on the substrate material which can be used herein, so long as the materials exhibit sufficient wet-strength to maintain structural integrity through the complete washing cycles in which they are used. Substrate materials, like non-bleach components of the bleach slurry, should have satisfactory ignition temperature, chlorine scavenging half life and chlorine capacity (see Examples 4 and 5).

The substrate may have any one of a number of physical forms such as sheets, blocks, rings, balls, rods or tubes. It is understood that the bleaching article described herein as a sheet may be any of these alternate forms. Such forms are preferably amenable to unit usage by the consumer, i.e. they should be capable of addition to the washing liquor in unit amounts, such as individual sheets, blocks or balls and unit lengths of rods or tubes.

The nonwoven fabric substrates usable in the invention herein can generally be defined as thermally bonded or adhesively bonded fibrous or filamentous products, having a web or carded fibre structure (where the fibre strength is suitable to allow carding) or comprising fibrous mats, in which the fibres or filaments are distributed haphazardly or in random array (i.e. an array of fibres in a carded web wherein partial orientation of the fibers is frequently present as well as a completely haphazard distributional orientation) or substantially aligned. The fibres or filaments can be natural (e.g. wool, silk, wood pulp, jute, hemp, cotton, linen, sisal or ramie), synthetic (e.g. rayon, cellulose, polyvinyl derivatives, polyolefins, polyamides or polyesters) or mixtures of any of the above. Examples of materials suitable to carry the thickened bleach composition include International Paper Co. code 9335064, a point-bonded polyester fiber material; Scott 6724, a polypropylene fiber material; Scott 6815, a polyester fiber material; and Reemay 2200, a polyester fiber material.

A preferred example of a thermally bonded nonwoven fabric substrate is the point-bonded polyester nonwoven fabric with weight of 1.25 ounce per square yard available from the International Paper Company, code 9335064.

However, it is noted that certain adhesive bonded substrates are not suitable for the bleaching article. The reason for adhesively bonding some substrates is that their fibers are not amenable to thermal bonding and must be adhesively bonded. When incorporated in the article, these substrates tend to become brittle and crumble in storage or to collapse and disintegrate in the wash, with the unpleasant result of releasing the thousands of fibers through the laundry. It is believed the undesirable brittleness and substrate disintegration are due to incompatibility of the adhesive binder on the substrate with bleach.

It is of course preferred that any adhesive bonded substrate employed for the bleaching article be bleach-stable. However, manufacturers of synthetic fiber substrate rarely disclose which adhesive material they use on the substrates. Thus, to identify substrates with bleach-stable adhesive binders, the chemical compatibility tests described below in Examples 4 and 5 may have to be run. Alternatively, one may subject the substrate material to mechanical and chemical compatability tests described below.

(In some cases, the resinous binder holding substrate fibers together may also help bind bleach particles to the substrate. Only in these cases does the adhesive substrate binder act as a "co-binder" or adhering substance for the bleach slurry. Generally, the bleach slurry applied to the substrate should include cobinder to assure sufficient binding of particles to the substrate. Resinous binders which are believed to help bind bleach articles in this manner include urethane binders.)

While these fibers have usually appeared in adhesively bonded substrates only, they are now appearing in substrates having blends of 2, 3 or more fiber types. A fiber blend may mix rayon with a fiber usually thermally bonded, e.g. polyester. Such substrates are also fully suitable for the bleach article and include 7332, a polyester, rayon, and nylon mixed fiber material; 7320, a polyester rayon mixed fiber material, Stearns & Foster F-4334, a 50/50 rayon/polyester blend that is acrylic resin bonded. Depending on the proportions of the fibers, the entire substrate may be entirely thermally bonded with no adhesive binder used at all.

A further class of substrate material that can be used in the present invention comprises an absorbent foam like material in the form of a sheet. The term absorbent foam-like material is intended to encompass three dimensional absorptive materials such as "gas blown foams", natural sponges and composite fibrous based structures such as are disclosed in U.S. Pat. Nos. 3,311,115 and 3,430,630 specifically incorporated herein by reference. A specific material of this type is a hydrophilic polyurethane foam in which the internal cellular walls of the foam have been broken by reticulation. Foams of this type are described in detail in U.S. Pat. No. 3,794,029 which is hereby incorporated by reference.

The substrate should be mechanically and chemically compatible with the bleach slurry and its processing and use conditions. Substrate materials that are mechanically compatible with conditions of use, i.e. which pass through the dryer cycle substantially without damage are preferred, are those which do not undergo minor changes in appearance during the wash cycle, viz., pilling, pulling, tearing, etc. Mechanical compatibility of the substrate is tested by subjecting a sheet substrate to actual wash and dry conditions. A normal sized sheet about 9" by 11" sheet is added to a washing machine. The machine has a 17 gallon capacity and is loaded with 6 pounds of white cotton ballast plus the sheet and a recommended amount of laundry detergent (e.g., 97 grams of Surf). The wash cycle is run on hot in 17 gallons of Edgewater, NJ municipal water at 130° F. for 15 minutes with a 5 minute rinse. The ballast with the sheet is then added to a clothes dryer and dried at normal or high heat settings. A polyester fiber substrate (Reemay 2200) survived these steps intact while showing some pilling, while a 50/50 rayon/polyester resin bond substrate (Stearns F-4355) disintegrated into a mass of shredded fibers. Other traits which desirable substrate materials should have include suitable softness and air porosity.

The chemical, or bleach, stability of different substrate materials should be determined by subjecting candidate substrate materials to the tests described in Examples 4 and 5 to treatment with concentrated chlorine bleach in a fume hood. A 3" by 3" swatch of the substrate is soaked for one hour at room temperature in one liter of an approximately 1000 ppm av. $Cl_2$ hypochorite solution in 0.1 M phosphate buffer at about neutral pH. The bleach solution may be about one-fiftieth dilution of Clorox brand bleach. Phosphoric acid or aqueous sodium hydroxide may be used to adjust pH of the solution. The swatch is then removed from the bleach solution, squeezed dry and rinsed under cold running tap water, and air dried.

A control swatch is soaked in one liter of water for an hour at room temperature, then squeezed dry, rinsed and air dried. The standard tensile strength of each swatch is then measured. The tensile strength of the test and control swatch may be determined by the test method set forth by the American Society of Testing and Materials ("ASTM") in designation D168-64(75) "Breaking and Elongation of Textile Fabrics", hereby incorporated by reference. Substrates having tensile strength after the chlorine solution treatment of at least about 6.5 lbs. in the machine direction (MD) are deemed acceptable to bear the thickened bleach composition in the bleaching article of the invention.

In most cases, it is apparent which substrate materials lack bleach stability: swatches of such material undergo significant loss of tensile strength and may be pulled apart with little effort while the control has all or most of the integrity of a dry standard swatch of the same material.

Methods of making nonwoven cloths are not a part of this invention and being well known in the art, are not described in detail herein. Generally, such cloths are made by air or water laying processes in which the fibres or filaments are first cut to desired lengths from long strands, passed into a water or air stream, and then deposited onto a screen through which the fibre-laden air or water is passed. The deposited fibres or filaments are then adhesively bonded together, dried, cured and otherwise treated as desired to form the nonwoven cloth. Nonwoven cloths made of polyesters, polyamides, vinyl resins, and other thermoplastic fibres can be spunbonded, i.e. the fibres are spun out onto a flat surface and bonded (melted) together by heat or by chemical reactions.

Process of Making Bleaching Article

The bleaching article may be made by any process which applies the slurry to the substrate such that the slurry is substantially evenly distributed over the substrate for impregnation thereof. The slurry-substrate complex is subjected to drying so the resulting article feels dry to the consumer and has no more than 30% free water. For good storage stability, the article should have no more than 15% free water.

Conventional means for manufacturing the bleaching article include coating the substrate with slurry via slot die extrusion, reverse role coating, and dip and squeeze techniques. Any series of steps which allows the substrate sufficient residence time in the slurry (or exposure time to the slurry) to substantially saturate the substrate is preferred.

Conventional means further include removing moisture from the slurry-substrate complex, for example, by drying processes such as air flotation, convection drying, infrared drying and microwave drying.

It will be recalled that the chlorine bleach slurry is a harsh corrosive substance. Thus, industrial machinery used to manufacture the bleaching article will preferably be shielded appropriately to protect parts susceptible to corrosion by the chlorine bleach. For example, rollers used in dip and squeeze techniques resemble rollers used in paper-making. Rather than having rubber or bare metal surfaces however, it is preferred the roller surfaces exposed to the slurry have a thermoplastic or Teflon ® coat. Similarly, if a doctor blade is used to scrape excess slurry from the substrate, the blade may preferably be a bleach-stable plastic, or metal rather than a corrodable metal.

In one method of making the bleaching article, the bleach slurry is applied to nonwoven cloth by a method generally known as padding. The slurry is placed into a pan or trough, which may be heated if desired to provide desired fluidity. A roll of absorbent substrate is then set up on an apparatus so that it can unroll freely. As the substrate unrolls, it travels downwardly and, submersed, passes through the pan or trough containing the bleach slurry at a slow enough speed to allow sufficient impregnation. The absorbent substrate then travels, at the same speed, onwardly and between a doctor blade and roller or through a pair of rollers which squeeze off excess slurry. The coated substrate is then dried by passage through a convective air-impingement oven to dry the slurry-substrate complex to a free-water level of about 8% plus or minus 7%. After this drying step, the slurry-coated substrate can be folded, cut or perforated at uniform lengths, and the final bleaching article then packaged and/or used.

The preferred execution in this case is application of the slurry using a slot-die applicator in which the bleach slurry is pumped through a slotted orifice onto the moving web which may be backed by a roller or other support. This process allows direct application to the substrate providing good penetration and has the advantage that the orientation of the applicator has little impact on the coating application. In addition, the coating level may be readily regulated to an extent by adjusting the pumping rate to the speed of the moving web. Maintaining the slurry in a closed system until application avoids over thickening resulting from evaporation of the fluid which may occur when using an open pan. This method of application is known primarily for the application of hot melt adhesives.

The Bleaching Article

The amount of bleach delivered to the washing machine depends on the size of the substrate carrying the dried slurry, the amount of slurry coated on the substrate and the concentration of chlorine bleach in the slurry.

The size and shape of the substrate sheet is a matter of choice and is determined principally by factors associated with the convenience of its use. Thus, the sheet should not be so small as to become trapped in the crevices of the machine or the clothes being washed or so large as to be awkward to package and dispense from the container in which it is sold. For the purposes of the present invention, sheets may range in surface area from 5 to 250 square inches. The preferred size range is from about 80 to about 120 square inches.

The concentration of chlorine bleach in the slurry and the amount of slurry on the substrate are also matters of choice which may be determined mainly by convenience. Since many consumers habitually use a liquid chlorine bleach, it is deemed desirable that each bleaching article deliver an amount of bleach comparable to some standard amount of liquid bleach. One standard volume of liquid bleach consumers use is one cup (English volume measurement); frequently, the amount of liquid bleach added to a wash is a fraction or multiple of a single cup of bleach. The bleaching article may be formulated so that one cup (or fraction or multiple thereof) will be delivered by each article. Thus, a unit dose of the bleaching article may contain the amount of bleach in 0.05–2.0 cups of commercial sodium hypochlorite solution, or preferably 0.1–2.0 cups and most preferably 0.25–0.5 cups. Since each cup of commercial sodium hypochlorite solution delivers about 180 ppm to the wash, these volumes of bleach correspond respectively to 9 to 360 ppm, preferably 18 to 180 ppm and most preferably 45 to 90 ppm of bleach delivered to the wash.

A highly preferred article herein comprises the chlorine bleach compound in water-releasable combination with a sheet which should be flexible so as to make it compatible with the movement of the fabrics in the washing machine and to facilitate its handling during manufacture and use of the product. Preferably, the sheet is water permeable, i.e. water can pass from one surface of the sheet to the opposite surface and, for film type substrates, perforation of the sheet is desirable. The most preferred form of the substrate is a sheet of woven or nonwoven fabric or a thin sheet of open cellular plastic material. Woven fabric sheets can take the form of a plain weave natural or synthetic fibre of low fibre count/unit length, such as is used for surgical dressings, or of the type known as cheese cloth. Loading limitations on sheet type substrates limit the amount of bleach that can be applied to the sheet namely to a range represented by a slurry:sheet weight ratio of about 0.5:1 to about 40:1, preferably 1:1 to 20:1 and most preferably 2:1–5:1. (See Example 8 below.)

The following examples will more fully illustrate the embodiments of the invention. As will be readily apparent to persons of ordinary skill in the art to which the present invention pertains, various modifications of such invention as hereinbefore set forth and as further defined in the appended claims may be made without departing from the spirit and scope thereof.

EXAMPLE 4

Ignition Tests

This example discusses the ignition temperature of bleach slurry and bleaching article components. Because many materials undergo exothermic reaction at elevated temperatures with oxidants such as bleach, this test is performed to identify components likely to cause such runaway reactions.

In the test, a sample of equal parts by weight of a dry bleach and a slurry or article component is formed. (Neat samples of bleach are tested without any other component.) The sample is then heated at about 3°–5° C. per minute, and its temperature rise is recorded.

The ignition temperature ($T_i$) is arbitrarily defined as that temperature at which the sample heating rate is significantly greater than the applied heating rate, ie over 10° C. per minute.

The following guidelines were used in evaluating the safety of compositions.

| $T_i$ (°C.) | Interpretation |
|---|---|
| <100 | Unsafe. Do not use. |
| >100 | May be used with extreme caution on an experimental scale. Monitor samples closely for any signs of reactions. dispose of unnecessary materials. Additional testing and evaluation necessary. |
| >120 | Use with caution. May be scaled up if sufficient experience is developed and additional stability compatability tests have been conducted. |
| >150 | Unreactive. May be used with appropriate caution. |

It should be noted that the $T_i$ may vary for one component depending on the bleach with which it is tested. Reactivity of one component with one bleach may provide an indication of reactivity with another; however, the $T_i$ of a dispersant with NaDCC may be within the unreactive range, but in the range of caution or extreme caution with another bleach.

Figure 2:
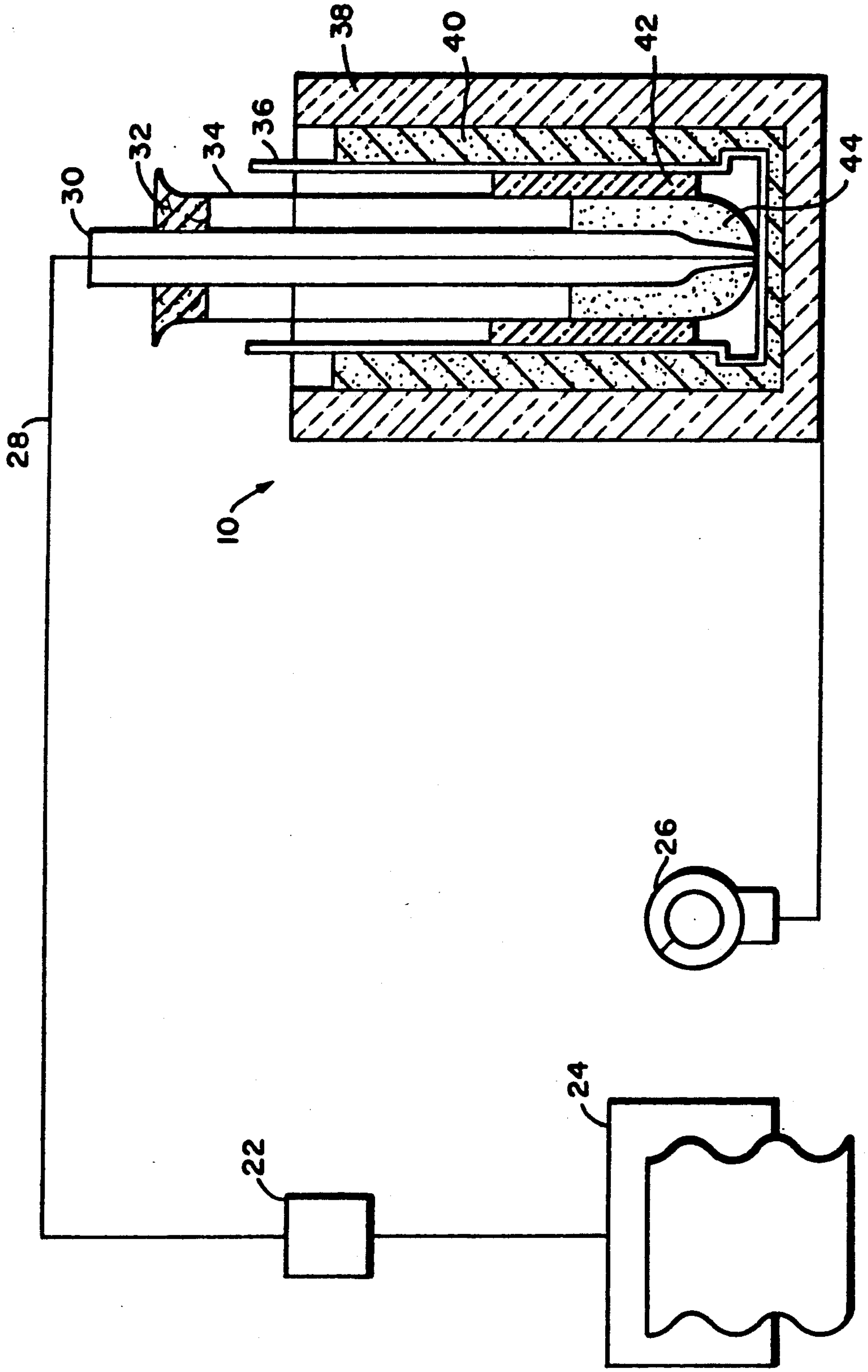
FIG. 2 illustrates the apparatus used in the ignition tests in Example 4 below.

The apparatus used in these tests is shown in FIG. 2.

The ignition test protocol is set forth more particularly as follows. A 1.5–10.0g sample (Note 1) of the test material is placed in a thick-walled 25×200 mm test tube. A thermocouple probe in a protective PYREX glass sleeve is inserted into the sample which is then lowered into a steel pipe in a sand heating bath constructed from a heating mantle as shown in the FIG. 2. A safety shield is placed around the sand bath which is then heated at a rate of 3°–5° C./min (Note 2) by applying an appropriate fixed voltage while the sample temperature was recorded. The test is halted when the sample temperature exceeds 200° C.

Note 1: The sample size may be varied depending on the intensity of the thermal transitions and the potential hazards. The sensitivity of the thermocouple, however, typically requires a minimum sample of 1 g while samples greater than 5 g may present an unacceptable hazard.

Note 2: The heating rate of 3°-5° C./min is specified to complete tests in 20-30 mins. and to minimize dissipation of exotherms by the apparatus.

There follow ignition temperatures for several components of the bleach slurry or the bleaching article.

| | Sample Wt. (g) | $T_i^a$ (°C.) |
|---|---|---|
| Sample Description | | |
| Neat NaDCC | 2.5 | >200 |
| Int. Paper polyester nonwoven #9335064 | 5.0 | >200 |
| LMW-100N | 3.0 | >200 |
| Phorwhite BHC-766, Bayer-Mobay | 5.0 | 190 |
| Ignition Temperatures for 1:1 NaDCC Admixtures | | |
| Sample Description | | |
| Polymers | | |
| HPC, hydroxypropylcellulose | 5.0 | 86 |
| Polyvinyl alcohol | 2.0 | 86 |
| PVP K-60 | 5.0 | 90 |
| Acrysol ASE-60 | 5.0 | 164 |
| Rhoplex HA-8 | 5.0 | 166 |
| NS-78-6312 | 5.0 | 141 |
| NS-78-6210 | 5.0 | 182 |
| NS-78-6146 | 5.0 | 180 |
| NS-78-6295 | 5.0 | >200 |
| SMA-1440A, poly(styrene-co-maleic anhydride) derivatives: | | |
| Fully hydrolyzed | 5.0 | 154 |
| n-Octyl monoester | 5.0 | 106 |
| EMA-1103, poly(ethylene-co-maleic anhydride) derivatives: | | |
| Monomethyl ester, 10% esterified | 2.0 | 170 |
| n-Butyl ester, 10% esterified | 5.0 | 164 |
| Sodium isethionate ester, 10% esterified | 3.0 | >200 |
| Solvents | | |
| Acetonitrile | 20.0 | 140$^{1}$ |
| Isopropanol | 20.0 | >200 |
| Methanol | 20.0 | 100$^{3}$ |
| Ethanol | 20.0 | >200 |
| Acetone | 20.0 | >200 |
| Miscellaneous Materials | | |
| Cyanuric acid | 5.0 | >200 |
| Urea | 5.0 | 45$^{3}$ |
| Silwet | 5.0 | 112 |
| Melamine | — | 140$^{3}$ |
| Ammelide | — | 134$^{3}$ |
| Ignition Temperatures for 1:1 DCDMH Admixtures | | |
| Sample Description | | |
| Neat DCDMH | — | >200 |
| Polymers | | |
| HPC | — | 52$^{3}$ |
| LMW-100N | 5.0 | 200 |
| Tamol 850 | — | 180 |
| Tamol 960 | — | 174 |
| Monofax 1214 | — | 100 |
| SMA-1440A n-octyl ester | — | 100 |
| EMA-1103 derivatives: | | |
| Hydrolyzed to the diacid | 2.0 | 136 |
| Methyl ester, 10% esterified | 2.0 | 130 |
| n-Butyl ester, 10% esterified | 2.0 | 132 |
| Sodium isethionate ester, 10% esterified | 2.0 | 154 |
| Miscellaneous Materials | | |
| Polyester substrate, Int. Paper 9335064 | — | 194 |
| Silwet | 2.0 | 120 |
| Ignition Temperatures for 1:1 BCDMH Admixtures | | |
| Sample Description | | |
| Neat BCDMH | — | 190 |
| Polymers | | |
| LMW-100N | 10 | 150$^{1}$ |
| EMA-1103, fully hydrolyzed | — | 180$^{3}$ |
| HPC | — | 70$^{3}$ |
| Silwet | — | 140$^{3}$ |
| Lauryl alchol sulfate | — | 100$^{3}$ |
| Talc | 10 | 162$^{2}$ |

Polymers And Their Suppliers

-continued

| Trade Name | Description | Supplier |
|---|---|---|
| Acrsol LMW-100N | Rohm & Haas | Sodium polyacrylate |
| Acrysol ASE60 | Acrylic copolymer emulsion | Rohm & Haas |
| EMA 1103 | Poly(ethylene-co-maleic anhydride) | Rohm & Haas |
| NS-78-6146 | Poly(acrylate-co-styrene) emulsion | National Starch |
| NS-78-6210 | Acrylic copolymer emulsion | National Starch |
| NS-78-6295 | Acrylic resin | National Starch |
| NS-78-6312 | Vinyl-acrylic copolymer emulsion | National Starch |
| Rhoplex HA-8 | Acrylic latex resin | Rohm & Haas |
| Sokalan CP-5 | Sodium poly(acrylate-co-maleate) | BASF |
| Sokalan CP-7 | Sodium poly(acrylate-co-maleate) | BASF |
| SMA 1440A | Poly(maleic anhydride-co-styrene) | ARCO |
| Tamol 850 | Polymethacrylate | Rohm & Haas |
| Tamol 960 | Polymethacrylate | Rohm & Haas |
| Versa TL-3 | Sodium poly(maleate-co-styrenesulfonate) | National Starch |
| Versa TL-70 | Sodium polystyrenesulfonate | National Starch |

$^{a}$3 = severe, 2 = strong, 1 = moderate, none = mild

EXAMPLE 5

Reactivity Toward Aqueous Chlorine Bleach

The reactivity of material with chlorine bleach is an important consideration in selection of potential bleach slurry and bleaching article components. The ignition tests in Example 4 provide an evaluation of compatibility of dry mixtures. Two additional tests,"Chlorine Scavenging" and "Chlorine Capacity", were developed to gauge the reactivity of chlorine bleach with bleach slurry or article additives under conditions which mimic the aqueous bleach slurry. These tests are primarily of use to evaluate polymeric dispersants and binders but may also be used to evaluate a variety of additives, such as surfactants.

Both tests are conducted at pH 7.0, nearly optimum for NaDCC slurries. Sodium hypochlorite is used as the bleach instead of NaDCC for convenience and because it is the actual active bleaching agent generated by hydrolysis of the dissolved NaDCC.

Chlorine Scavenging

The chlorine scavenging test measures the rate of bleach activity loss of sodium hypochlorite in a large excess of the additive. This is, in a sense, a pseudo first order rate study. The activity loss is monitored over a period of 3-4 half lives, until it is <50 ppm av $Cl_2$.

Separate solutions are prepared of about 200 ml of a 11.1 wt % (or 5.6 wt %) of the material to be tested and sodium hypochlorite at 5000 ppm av $Cl_2$ in 0.2 M pH 7.0 phosphate buffer. A 20 ml portion of the chlorine solution is added to a 180 g portion of the test solution giving a mixture 10 wt % (or 5 wt %) in the test material and 500 ppm av $Cl_2$ as hypochlorite. The start time is taken at the point when half of the stock chlorine solution has been added. A separate blank solution is also prepared by adding 20 ml of the stock chlorine solution to 180 g of phosphate buffer. Aliquots (10-20 g) of the blank solution and the mixture are taken at appropriate intervals and analyzed for changes in pH and remaining activity by iodometric titration. The half lives for chlorine scavenging are determined from a plot of the percent remaining activity verses time.

A blank solution shows almost no activity loss while those containing polymeric dispersants and binders have varying rates of reaction as shown in the accompanying figure. Materials are judged on the basis of their relative reactivities as measured by their half lives ($t_{½}$) listed in the table below. Unless otherwise noted, the components are tested at a 10 wt % concentration.

| Polymer Chlorine Scavenging Half Lives | |
|---|---|
| Component | $t_{½}$ |
| LMW-100N | 5.5 |
| LMW-100N (5 wt %) | 24.0 |
| LMW-10N | 10.0 |
| LMW-20N | 0.3 |
| LMW-45N | 15.0 |
| LMW-400N | 5.5 |
| Acrysol A-1 | 1.5 |
| Acrysol A-3 | <0.2 |
| Acrysol A-5 | <0.2 |
| Sokalan CP-5 | 0.2 |
| Sokalan CP-7 | 0.3 |
| Sulfonated polystyrene | 0.7 |
| Versa TL-3 | 0.03 |
| Versa TL-70 | 0.4 |
| Narlex D-52 | 1.5 |
| NS 78-6146 (5 wt %) | 0.5 |
| NS 78-6210 (5 wt %) | 1.1 |
| NS 78-6312 (5 wt %) | 1.5 |
| Rhoplex HA-8 (5 wt %) | 1.5 |

Polyacrylates as a group are seen to have the slowest rates of reaction. Such slower rates of reaction are preferred. Many potential dispersants and binders react very quickly In some cases rates of reaction are inconsistent with expectations based on the compounds structure. The curves of the activity loss versus time suggest that there is an initial fast reaction followed by a much slower one. It was thought that the initial rate is possibly due to the presence of highly reactive impurities or additives such as surfactants used in the preparation of the materials especially with latexes. A chlorine capacity test was devised to determine, in effect, the amount of hypochlorite required to neutralize these reactive materials.

Chlorine Capacity

The chlorine capacity test is conducted under similar conditions as the scavenging test. Basically, a 5 wt % solution of the polymer in 0.2 M pH 7.0 phosphate buffer is treated with portions concentrated sodium hypochlorite solution until the reaction half life exceeds an acceptable value of 24 hrs., comparable to that of LMW-100N.

More particularly, 200 g of a 5 wt % solution of the material to be tested in 0.2 M pH 7.0 phosphate buffer is prepared and treated with sufficient commercial sodium hypochlorite solution (about 4 ml at 5 % av $Cl_2$) to give a concentration of about 1000 ppm av $Cl_2$. The test solution is evaluated after 24 hrs for any change in pH and remaining activity by iodometric titration of a 5 g aliquot. The test is repeated by adding fresh portions of sodium hypochlorite after daily analysis until the remaining activity was >500 ppm av $Cl_2$ or until six portions of hypochlorite have been added. The amount of sodium hypochlorite which results in a residual activity ≧500 ppm av $Cl_2$ is defined as the chlorine capacity Materials which exhibit chlorine capacities >5000 ppm av $Cl_2$ or a chlorine capacity of greater than 10% are considered unacceptable.

The results for several materials are listed below.

| Chlorine Capacities | | |
|---|---|---|
| | Chlorine Capacity | |
| Component | ppm av. $Cl_2$ | Ratio (%)[a] |
| NS 78-6146 | 2600 | 5.2 |
| NS 78-6210 | 2750 | 5.5 |
| NS 78-6295 | 3100 | 6.2 |
| NS 78-6312 | >5000 | >10 |
| Versa TL-3 | 1800 | 3.6 |
| Versa TL-70 | 2200 | 4.4 |
| Narlex D-52 | 2200 | 4.4 |
| Rhoplex HA8 | 3100 | 6.2 |

[a]Ratio = (wt % av $Cl_2$)/(wt % polymer)

Materials with chlorine capacities <10% of their weight are considered acceptable for testing and evaluation unless other tests, such as ignition studies prove negative. Caution must be exercised since the "neutralized" component may pose a latent hazard. Initial formulation studies should be conducted on as small a scale as is practical with frequent monitoring. The polymers are generally pretreated with an amount of hypochlorite defined by their chlorine capacities before use in bleach sheet slurry formulations.

WARNING: Normal precautions used in working with chlorine bleaches should be employed when conducting these tests. Under no circumstances should amines, ammonium salts, or most other nitrogen compounds be used since they potentially give rise to extremely hazardous chloramines.

EXAMPLE 6

The viscosity of several bleach dispersions was measured on a Haake Rotovisco viscometer model RV-3 with either an MK-50 or an MK-500 measuring head and an MV1 and SV1 cup and spindle. The temperature was regulated using a Lauda RMS-6 refrigerating circulator with a claimed control accuracy of + or −0.01° C. The viscometer was calibrated against standard oils and then the bleach slurries were measured. The reported single value viscosities were determined by shearing the slurries at a constant shear rate of 80 per sec for 20-30 minutes after which a steady shear stress was observed.

Powdered sodium dichloroisocyanurate ("NaDCC") was added as supplied by Olin Corp. to water and polyacrylate as indicated:

| Bleach (Wt %) | Polyacrylate LMW-100N (Wt %) | Water (Wt %) | Viscosity (cP at 25° C.) |
|---|---|---|---|
| 68.0 | 4.0 | 28.0 | 3103 |
| 65.0 | 4.0 | 31.0 | 1310 |
| 60.0 | 5.0 | 35.0 | 683 |
| 59.5 | 12.0 | 28.5 | 6210 |
| 54.0 | 10.0 | 36.0 | 1187 |
| 54.0 | 5.0 | 41.0 | 144 |
| 46.0 | 13.0 | 41.0 | 583 |
| 45.0 | 5.0 | 50.0 | 100 |
| 40.0 | 13.0 | 47.0 | 241 |

EXAMPLE 7

Three fluorescent whitening agents are evaluated for incorporation into the bleach slurry and sheet: Ciba-Geigy Tinopal RBS-200 and CBS-X and Bayer-Mobay Phorwhite BHC-766. CBS-X loses a significant amount of activity when formulated with the bleach slurry. RBS-200 also loses some of its fluorescent activity during short term processing. In comparison, BHC loses no activity even under prolonged use, delivers excellent brightening benfits, and is easy to incorporate into the standard formulation with no changes. BHC is therefore used as the fluorescer of choice.

The evaluation of three commercial bleach-stable fluorescers is by standard F-Dye tests (described in U.S. Pat. No. 4,460,485 hereby incorporated by reference). Individually preweighed mixtures of the fluorescer with 1.217 g of powdered NaDCC in sample vials are provided for use in these Kleenette studies. The pertinent results for the cummulative five wash fluorescence effects are summarized in the tables below. The first table gives the results for both high and low fluorescer concentrations using dye-free liquid "all". The high and low concentrations are equivalent to 1 g and 0.1 g per normal wash dose (sheet), respectively.

Fluorescer Performance in the Presence of 60 ppm Chlorine

| Fluorescer | Dose | Monitor Cloth Type | | |
|---|---|---|---|---|
| (Supplier) | g/3 gals. | Cotton | Nylon | Dacron |
| Phorwhite BHC-766 | 0.1765 | 42.1 | 28.9 | 5.7 |
| (Bayer-Mobay) | 0.0177 | 22.6 | 15.7 | 4.2 |
| Tinopal RBS-200 | 0.277 | 36.4 | 31.3 | 25.7[a] |
| (57% active) | 0.0277 | 23.2 | 18.2 | 6.1 |
| (Ciba Geigy) | | | | |
| Tinopal CBS-X | 0.1765 | 34.7 | 17.5 | 4.3 |
| (Ciba Geigy) | 0.0177 | 6.8 | 4.1 | 3.8 |

[a]Yellowed.

EXAMPLE 8

A chlorine bleach slurry and a bleaching article are made with the following formulation:

| Component | Slurry | Wet Sheet | Dry Sheet |
|---|---|---|---|
| Bleach | 51.2% | 43.0% | 55.4% |
| Dispersants & Binders | 11.2 | 9.4 | 12.1 |
| Fluorescer | 1.6 | 1.3 | 1.7 |
| Water | 36.0 | 30.2 | 10.0 |
| Substrate | — | 16.1 | 20.8 |

The bleaching article has a wet loading ratio of about 5.2:1 and a dry loading ratio of about 3.8:1.

The bleaching article delivers 4.4 grams of active chlorine (g av $Cl_2$) to the wash.

What is claimed:

1. A bleaching article for use in laundry cleaning comprising:

(a) a flexible substrate; and (b) an aqueous slurry composition which is stable at a pH of 5 to 8 and which is evaporated at elevated temperatures onto the flexible substrate, the slurry composition consisting essentially of (1) 20-90% by weight of a chlorine bleach, (2) 2 to 30% by weight of a polymeric material selected from the group consisting of polyacrylate and copolymers of acrylic and maleic acid, wherein the polymeric material is bleach stable and is in a ratio of the chlorine bleach to the polymeric material of 10:1 to 3:1, and (b 3) a balance of water 2. An article according to claim 1 further comprising 0.01 to 10% by weight of a bleach stable fluorescent whitening agent.

3. An article according to claim 1 further comprising 2 to 35% of a film forming latex or 0.1 to 20% of a surfactant as a co-binder.

4. The article according to claim 1 in which the slurry is applied to the substrate in a ratio of 0.5:1 to 40:1.

5. The article according to claim 4 wherein the ratio of slurry to substrate is 2:1 to 15:1.

6. A method of forming a bleaching article for use in laundry cleaning consisting essentially of:

(a) adding 2 to 30% by weight of a bleach stable polymeric material selected from the group consisting of polyacrylate and copolymer of acrylic and maleic acid to an aqueous base to form a slurry composition;

(b) neutralizing the slurry composition to a pH of 5 to 8 to form a stable aqueous composition;

(c) adding 20 to 90% by weight chlorine bleach to the stable composition of step (b) in a ratio of 10:1 to 3:1 of the chlorine bleach to the polymeric material to form a concentrated chlorine slurry; and (d) drying the concentrated chlorine slurry of step (c) at elevated temperatures onto a flexible substrate to form a bleaching article.

7. The method according to claim 6, wherein the neutralizing step further includes mixing 0.1 to 10%l of a surfactant or 2 to 35% of a film forming latex as a co-binder to the stable aqueous composition.

8. A method of providing bleaching benefit to fabrics comprising:

(a) agitating fabrics in a aqueous laundry solution; and (b) adding a bleaching article to the laundry solution, the article comprising a bleach-stable substrate, and a dried bleaching composition carried on the substrate, the composition comprising 20 to 90% by weight of a chlorine bleach, and 5 to 20% by weight of a selected from the group consisting of polyacrylates and copolymers of acrylic and maleic acid, polyanionic polymeric material having a molecular weight of 1,000 to 100,000 and the polymeric material being bleach stable, the dried composition being derived from an aqueous bleach slurry which is stable at a pH of 5 to 8.

* * * * *